2,788,072

METHOD OF FRACTURING A WELL FORMATION

Lloyd O. Goodwin, Tulsa, Okla., assignor to Pan American Petroleum Corporation, Tulsa, Okla., a corporation of Delaware No Drawing. Application February 13, 1952, Serial No. 271,419

10 Claims. (Cl. 166—42)

This invention pertains to an improved method for treating wells. More particularly, this invention pertains to an improved method for isolating formations which are to be fractured from other formations penetrated by a well.

It has been proposed to increase the permeability and productivity of a formation penetrated by a well by injecting into that formation at high pressure a viscous or otherwise low-penetrating liquid which fractures a formation in the area adjacent the well. In order to produce a fracture it is sometimes desirable to isolate a very small part of the permeable formations penetrated by the well so that loss of the fracturing liquid can be reduced and it can be injected into the well at a much more rapid rate than the rate at which it leaks away into the open formations. Formations have thus been isolated by placing packers in a well isolating a small section at the lower end of the well or isolating a small section adjacent the casing seat of a well. Similarly, intermediate sections of the open section of the well have been isolated by using straddle packers, i. e., two packers seated in the well with a space between through which the fracturing liquid is injected into the well and thence into the formation.

It is an object of this invention to provide an improved method of isolating formations to be fractured. It is another object of this invention to provide a method of hydraulically isolating formations which are to be fractured. A still more specific object of this invention is to fracture a formation by first filling the well with an ultimately removable sealing agent which will not penetrate the pores of the formation and then injecting at selected intervals in the well a fracturing fluid which when injected into the formation will produce and extend a fracture. Additional objects of this invention will become apparent as the description thereof proceeds.

This invention, which is in the art of fracturing formations, comprises, in brief, the improvement wherein the formations penetrated by a well may be hydraulically fractured at selected intervals by isolating the selected intervals from the remainder of the well with a substantially non-penetrating liquid such as a temporary sealing agent, and then injecting a fracturing liquid into the isolated section of the well. In its broader aspects, it thus includes the fracturing of a well at a selected elevation or a multiplicity of selected elevations in the well by isolating the zones to be fractured hydraulically.

This process in greater detail comprises first filling the permeable portions of the well including the uncased or open section of a well and any perforations in the cased portions of the well with a temporary sealing agent. This temporary sealing agent is a viscous liquid or highly viscous gel which with respect to a low-penetrating or fracturing liquid has a substantially lower filtrate rate and which, when pressure is applied, enters the formation with considerably more difficulty than the fracturing liquids used in the previously proposed hydraulic fracturing process. The details of such fracturing liquids and processes are described in U. S. reissued Patent 23,733.

The viscosity of a plain temporary sealing agent, "plain" referring to a temporary sealing agent which contains no bridging material, is desirably 2 to 5 or more times the viscosity of the fracturing liquid. Whereas the fracturing liquid which is typically a gel has, as disclosed in the above-mentioned patent, typically a viscosity in the range 1000–5000 centipoises, a plain temporary sealing agent has a viscosity greater than the fracturing liquid, typically, 5000-50,000 centipoises as measured on the Halliburton Thickening Time Tester described in A. P. I. Code 32, paragraph 50–62 inclusive, or greater. While a temporary sealing agent may thus be a plain very viscous gel, the preferred temporary sealing agent, particularly where multiple fractures are to be produced in a single well, is a modified fracturing liquid containing bridging material. In the preparation of the preferred temporary sealing agent a quantity of the fracturing liquid is first made up by adding a bodying or gelling agent to a base liquid as described in the above-mentioned patent.

Generally, soaps which do not leave a gelatinous residue and which will produce gels at atmospheric temperature are suitable gelling or bodying agents. As an example of such a gelling agent for kerosene or similar hydrocarbons or for crude oil, aluminum soaps of fatty acids were combined in the following proportions: aluminum soaps of coconut fatty acid 30 percent, aluminum soaps of oleic acid 65 per cent, and aluminum soaps of naphthenic acid 5 percent. This mixture and closely related mixtures of aluminum soaps have been used in the preparation of compositions for flame throwers and incendiary bombs. They are known as a napalm-type soap and have been described in detail in an article entitled "Napalm" in Industrial and Engineering Chemistry, industrial edition, vol. 38, No. 8, August, 1946, at page 768.

From about 1.5 percent to about 10 percent or more of this soap by weight of the base liquid is dispersed in the base liquid as by stirring the two together. The amount of soap depends somewhat upon the base liquid. In general, a higher percentage of soap is required in the heavier hydrocarbons. In any case, the amount of soap is sufficient to produce a gel having a viscosity in the range 1000–5000 centipoises or greater as measured on said Halliburton Thickening Time Tester. In some cases, it is desirable to include in this gel a delayed action or dormant peptizer such as water or the lower alcohols. For example, from about 0.1 percent to about 3 percent, typically about 1 percent, by volume, of the peptizer may be incorporated in the gel by emulsification or the like. This peptizer appears to shorten the time required for the fracturing liquid and the temporary sealing agent to reach a maximum viscosity and, after several hours, to reduce the gel to a sol having a viscosity substantially equal to the viscosity of the base liquid.

The substantially non-penetrating liquid or sealing agent, as discussed above, may be highly viscous, i. e., its viscosity is from 2 to 5 times or more higher than the viscosity of the fracturing liquid. In some cases, however, it is considered desirable to employ the fracturing liquid without further increasing its viscosity and rendering it substantially non-penetrating by incorporating therein a bridging material. Bridging materials, sometimes called lost circulation recovery materials, are well-known in the drilling fluid art where these solid particles are used to regain circulation which has previously been lost. Bridging materials fall, generally, into one of the three following classes: (1) fibrous—pliable, stringy materials which tend to entangle or mat over a crevice; (2) granular—angular, rigid materials which tend to bridge against each other in a crevice without being distorted appreciably; and (3) lamellated—materials formed of thin sheets or flakes. The particle sizes of each of these materials vary over wide ranges, but, in general, it can be said that the particle size is substantially above the colloidal range (3,000 mesh, theoretical, or smaller) and above the slimy or smooth and non-gritty range (200–3,000 mesh). Granular bridging materials, for example, may have a particle size from about 3/16 inch maximum dimension (4 mesh U. S. sieve) down to about 100 mesh U. S. sieve. Lamellated and fibrous materials may have a maximum dimension in the range 1/16 inch to 1 inch or thereabouts. These materials are sufficiently rigid and of sufficient size to bridge in a fracture or on the surface of a fracture and form a framework which prevents flow of the temporary sealing agent into the fracture.

The bridging material, particularly a granular bridging material, is preferably provided in a gradation of particle sizes since bridging appears to depend somewhat upon a statistical arrangement wherein the larger particles start a bridge in a fracture and this bridge is further extended or completed by the bridging of smaller particles on the larger particles. Accordingly, the particle size of a granular bridging material is preferably a gradation of particle sizes covering substantially the range between about 4 and about 100 mesh U. S. sieve. Typically, also, the particle size distribution is adjusted such that the particles in the range 4–10 mesh constitute about one-half of the material and the particles in the minus 10 mesh and smaller range constitute the other half of the material.

Bridging materials of any of the above types may be used, provided, however, that the bridging material, especially the smaller particles, are desirably of a temporary nature, i. e., the solid particles are capable of being removed from the fracture and from the well by solution in a suitable solvent or the like. For this reason, I prefer a bridging material which is dissolved by the formation fluids, particularly, the crude oil produced by such formations. Bridging materials may be used which can be dissolved in the well by extraneous liquids such as acids. Among the bridging materials which are temporary and which can be dissolved in and removed from the formation by the indigenous fluids are a number of the harder waxes which may be flaked or granulated at atmospheric temperature such as yellow beeswax, carnauba wax, microcrystalline hydrocarbon waxes, and the like, fats and hardened oils, for example, highly hydrogenated oils including animal and vegetable oils, and thickened mineral oils such as cup grease or the like. Some of the solid coal tar fractions or fractionation derivatives such as naphthalene and anthracene and the chlorinated coal tar derivatives such as paradichlorobenzene are satisfactory due to their solubility in crude oil and their high melting points. In some cases, the bridging material, and particularly the larger particles of the bridging material, may be inert particles such as ground nut shells or ground hay, straw, or the like. These inert particles and the temporary bridging materials which are dissolved or sublimed in the well fluids when used together complement each other in some cases to produce a very satisfactory temporary sealing agent when slurried in a viscous gel.

The concentration of the bridging material in the temporary sealing agent may be varied over a substantial range depending, among other things, upon the consistency of the temporary sealing agent, the solubility of the bridging material in that liquid, and upon the size and shape of the bridging material. It has been found, for example, that a bridge will form over a fracture or highly permeable formation more rapidly the higher the concentration of the bridging material in the liquid component. For this reason, I prefer the concentration of the bridging material to be as high as can be handled by a pump to displace this material into the well with the pumping facilities available. It is considered desirable, particularly in the lower viscosity gels, to inject about 200–500 pounds of the bridging material in a barrel, 42 gallons, of the liquid component. As discussed above, in the gels having very high viscosity as compared to the fracturing liquid, no bridging material is required since it enters most formations only by applying extreme pressures.

This temporary sealing agent is injected into the well as by pumping. The material may be introduced into the well near the bottom and the well fluids therein displaced upwardly in the well. Alternatively, the temporary sealing agent may be injected into the well at any point and by application of high pressure the fluids in the well may be displaced back into the formations. The amount of temporary sealing agent injected into the well depends, generally, upon the extent of permeable formations exposed in a well. In the typical operation the volume of the well below the casing or below the uppermost perforation in the casing is filled with temporary sealing agent. It is considered desirable to introduce into the well an amount of temporary sealing agent sufficient to fill the open hole section and an additional amount may be used, typically, a surplus of 50 percent, to be assured that the upper level of the temporary sealing agent will not fall below the casing seat. This temporary sealing agent may then be sealed in the well and its movement restricted by placing a packer in the casing above or in the temporary sealing agent. Where the casing is not badly corroded, a fluid such as natural gas, air, oil, or the like, is injected into the casing above the temporary sealing agent to maintain a high back pressure on the temporary sealing agent and prevent it from being displaced into the casing when a fracturing liquid is injected into the well. This fluid may be used either with or without a packer in the casing.

When the permeable or open hole section of the well has thus been filled with the temporary sealing agent, the tubing outlet at the bottom of the well is adjusted so that its elevation is at the elevation at which it is desired to produce a fracture in the formations. The fracturing liquid which may be produced from a base liquid such as oil, water, or acid, and a bodying agent, as is well-known in the art and as described generally above, is then injected into the tubing and displaced as a column to the bottom of the tubing following the temporary sealing agent. The packer in the well annulus may then be seated or the casing head may be closed in case a packer is not used so that the temporary sealing agent will not be displaced up the well as additional fracturing liquid is injected into the well. High pressure is then applied to the fracturing liquid to displace it into the well. It displaces the temporary sealing agent from the area of the tubing outlet or tubing outlets, filling the well at this point with a fracturing liquid which is of lower viscosity and has a higher filtrate rate than the temporary sealing agent. As pressure is applied by pumping the fracturing liquid into the tubing, the pressure at the tubing outlet as well as the surface pressure appears to rise substantially directly proportionally to the amount of fluid injected. When sufficient pressure is applied, the formation is broken down or fractured at the elevation of the tubing outlet or outlets, i. e., the area contacted by the fracturing liquid. Apparently, due to this increased filtrate rate and the seeping of the fracturing liquid into the formation, a fracture is created selectively at the elevation where the fracturing liquid is injected into the temporary sealing agent. When the formation is fractured, i. e., when the formation breakdown pressure is reached, the surface pressure ceases to rise and, in many cases, drops appreciably. If there is no sharp drop in pressure, this formation breakdown pressure or the production of a fracture can be readily recognized from a plot or curve of pressure vs. rate of injection. It is practically impossible to obtain a substantial increase in bottom hole pressure after the formation is initially fractured even if liquid is injected into the formation at an increased rate. That is, after an initial fracture, there appears to be a decrease in resistance to flow of the fracturing liquid entering the formation. This is indicative of a formation fracture.

Any amount of the fracturing fluid may then be injected into the formation at this selected elevation. Typically, from about 500 to about 2,000 gallons of fracturing liquid are injected in a fracture and this is believed to extend the fracture or the passages produced by the fracture back into the formation radially for a distance of 50 feet or more. When the fracture has been extended the desired amount, pumping of the fracturing liquid into the formation is discontinued and if it is desired to produce another fracture in a formation at a different elevation, the elevation of the tubing outlet or outlets is changed by either raising or lowering the tubing. Injection of a second quantity of the fracturing liquid then proceeds as before, with the fracturing liquid being discharged into the temporary sealing agent in the well at a second elevation. The temporary sealing agent quickly seals the fracture initially produced by the injection of the first quantity of fracturing liquids at the first selected elevation. The fracturing liquid displaces the temporary sealing agent from the well in the area of the tubing outlet and, due to the penetration of the fracturing liquid into the formation at this elevation, produces a new fracture within a few feet of the tubing outlet when the pressure is increased to the formation breakdown pressure. As in the previous case, the fracture at the second and/or subsequent selected points in the well may be extended if injection of the fracturing liquid is continued after a fracture has been indicated by a decrease in the resistance of the fracturing liquid to flow. This procedure of locating the tubing outlet at a selected elevation in the well where a fracture of the formation is desired, fracturing or parting the adjacent formation, and extending the passages in the formation can be extended almost without limit. As many as ten or more fractures can obviously be produced at selected elevations in a well and such fractures have been found to be produced within a few feet of previously produced fractures. Where many fractures are produced, it is sometimes desirable to inject additional temporary sealing agent into the well between batches of fracturing liquid.

In one embodiment of this process the temporary sealing agent is placed in the permeable areas of a well leaving well fluids at one or more locations where a fracture is to be produced. By way of example, the temporary sealing agent is first placed at the bottom of a well, the top level being located at a selected elevation where a fracture is to be produced in the formations. This liquid may be placed by a dump bailer, by displacement through the tubing, or by merely pouring it into the well. If placed through the tubing, the tubing is then raised so that the tubing outlet is above the selected elevation at which a fracture is to be produced. A second batch of temporary sealing agent is then injected into the well to displace additional well fluids out of the permeable areas of the well leaving a quantity of well fluids between the two quantities of temporary sealing agent. This seals all permeable areas except at the point selected for the location of a fracture. The tubing outlet then is located in the area of the isolated well fluid in the well. Fracturing liquid may then, when the casing-tubing annulus is blocked off by a tubing packer or the like, be injected into this isolated area at high pressure to produce the fracture.

In another embodiment of this invention the bridging materials deposited on the formation face in the well are removed as the fracturing liquid is injected into the well. By removing these bridging materials from the face of the formation, entry of the fracturing liquid into the formation is expedited and a fracture can be produced at a lower pressure. This filter cake of bridging material may be removed by any of a number of means including, by way of example, abrasion, erosion, or solvation. In the removal of bridging material by abrasion, I have found that a wall scratcher used in the well casing cementing art can be attached to the lower end of the tubing or adjacent other tubing outlets and rotated or reciprocated by the action of the tubing so that a filter cake of bridging material is constantly removed and the formation is exposed to the fracturing liquid. Alternatively, the tubing outlets may comprise a nozzle or a series of one or more jets by which the fracturing liquid is jetted against the wall of the well to displace any bridging material filter cake deposited there. The fracturing liquid which is injected as the wall cleaning proceeds, or immediately thereafter, thus comes into contact with the formation and by the application of a high pressure the formation can be fractured.

In still another embodiment, the bridging material in the area of the tubing outlet may be dissolved at the same time or prior to the injection of the fracturing liquid. In the case of a naphthalene bridging material as above described, a quantity of a naphthalene solvent such as benzene may be injected into the well ahead of the fracturing liquid. This benzene dissolves the naphthalene particles readily and thus removes the bridging material filter cake on the face of the formation and in the well area adjacent the tubing outlet. The benzene, which is then followed by the fracturing liquid, thus exposes the formation to the fracturing liquid which tends to penetrate the pores and thus expedite fracturing, i. e., reduce the pressure at which a fracture is created in the formation. Then by application of the formation breakdown pressure the initial fracture is created and by continued injection of fracturing liquid the fracture may be extended or enlarged as desired.

When the desired number of fractures has been created at the selected elevations in the well, the fracturing liquid and the temporary sealing agent are desirably removed from the formations and from the well since they tend to plug the channels and passages produced. These materials, as is well-known, may be removed by any of a number of peptizers. This peptizer is injected into the well and subsequently into the formations at substantially the formation breakdown pressure or lower, thereby tending to follow the channels or passages produced by the fracturing liquid. This peptizer may be injected by itself or, more desirably, in dilute solution into the formation in any amount but a quantity between about one-half and about five times, preferably between about one and about two and one-half times the volume of the fracturing liquid, is injected into the well. This peptizer may be injected selectively into each passage created in the formation immediately following the fracturing liquid or it may be injected into all passages substantially simultaneously after the last passage has been completed. The peptizer may consist of any of the well-known hydrocarbon solvents, for example, halogenated hydrocarbon, carbon tetrachloride, carbon bisulfide, and the like. In many cases, a strong mineral acid will peptize a gel. Preferably, however, the peptizer comprises an effective surface-active agent such as the amines or oil-soluble sulfonates. These peptizers may be diluted with, for example, five or more volumes of a light hydrocarbon such as gasoline, kerosene, naphtha, or the like. The peptizer is allowed to stand in contact with the temporary sealing agent and the fracturing liquid for from several hours to a day or more. That is, the peptizer is allowed to remain in contact for a time sufficient to reduce the viscosity of these liquids to substantially the viscosity of the base liquid from which they were produced. The reduction of the temporary sealing agent to a very low viscosity is not essential inasmuch as it can be removed from the well in a very viscous state. The removal of the fracturing liquid from the formation is, however, considered desirable, particularly from the oil-producing formations since by its nature it obviously would, if not removed, plug the flow channels of the producing formation.

In some cases, it is considered desirable to incorporate in the fracturing liquid a delayed action or dormant peptizer. Suitable peptizers of this type are known in the art. They comprise in the case of the preferred gels, i. e., the hydrocarbon-soap gels, water, or the higher amines such as Rosin Amine D, a derivative of wood rosin manufactured by Hercules Powder Company. The derivative consists mostly of abietic-type acids, typically, dehydroabietic acid, dihydroabietic acid, and small amounts of tetrahydroabietic acid which by ammonolysis and hydrogenation have been converted to dehydroabietylamine, dihydroabietylamine, and tetrahydroabietylamine. This material is described in Corrosion, volume 7, No. 6, June 1951, at page 181. If between about ½ and about 3 percent of water is incorporated in these gels, the viscosity is reduced automatically to the viscosity of the base hydrocarbons within about twenty-four hours.

As an example of a test of the effectiveness of the above-described method of plugging or sealing a well so that it might be selectively fractured, a well was drilled 11 feet deep into a hard sandstone formation. Five and one-half inch casing was then cemented to bottom and the hole deepened to 13.5 feet, exposing 2.5 feet of the hard sandstone formation. This formation was then fractured by applying a pressure of 1100 p. s. i. on a fracturing liquid. The formation then took fracturing liquid at a pressure of 400 p. s. i. After the first fracture was created a low filtrate rate bentonitic clay base drilling mud containing 10 pounds per barrel of 4-10 mesh and 10 pounds per barrel of 10-100 mesh U. S. sieve ground walnut shells was pumped into the well. Pressure then rose to 3000 p. s. i., the pump capacity, and held—no mud leaked into the formation. The well was then opened and a rotary-type wall scratcher was lowered into the well and rotated as the fracturing liquid was circulated out of the well. After the filter cake of ground walnut shell bridging material was removed from the face of the formation, the fracture previously created was observed to be taking fracturing liquid again at 400 p. s. i. The temporary sealing agent which contained the bridging material was then injected into the well again and a pressure of 3000 p. s. i. was again applied without loss of any fluid from the well. The upper 1 foot of the open hole was then cleaned by rotating a rotary-type wall scratcher therein and circulating additional fracturing liquid. The well was shut in and at a pressure of 1700 p. s. i. a second fracture was indicated at which time the pressure dropped to less than about 400 p. s. i. The hole was then cleaned and baled dry and a system of mirrors and a camera was arranged to make a down-the-hole picture. This picture clearly showed the formation of two separate and distinct fractures which were separated by a distance of about 14 inches.

It will thus be seen that this invention contemplates in its broader aspects isolating a formation to be fractured hydraulically rather than mechanically and that a multiplicity of fractures can thus be created in a well with a minimum amount of equipment and expenditure of time. It will also be apparent that the invention is not limited by the above examples which are given by way of description of the invention. Various modifications will be apparent to those skilled in the art. For example, various modifications of the now well-known Hydrafrac process, e. g., the incorporation of propping agents such as sand in the fracturing liquid, can be used in this process with equal facility. Accordingly, this invention is not to be construed to be limtied to the embodiments herein described but is to be construed to be limited only by the scope of the appended claims.

I claim:

1. A method of fracturing a permeable formation at a selected elevation in a well including the steps of depositing in said well a temporary sealing agent comprising a slurry of bridging material in a viscous gel to seal the permeable areas of said well by depositing solids including said bridging material on the face of said permeable formation, injecting a quantity of fracturing liquid into said temporary sealing agent at said selected elevation, the filtrate rate of said temporary sealing agent being substantially lower than the filtrate rate of said fracturing liquid, removing bridging material from the face of said formation at said selected elevation, applying a pressure as great as the formation breakdown pressure to said fracturing liquid to inject said fracturing liquid into and fracture said formation at said selected elevation, contacting said fracturing liquid and a peptizer therefor to cause reversion of the fracturing liquid in said formation to a non-viscous liquid, and withdrawing said non-viscous liquid from said formation by removing liquids from said well.

2. A method according to claim 1 in which said bridging material is removed from the face of said formation at said selected elevation by abrasion.

3. A method according to claim 1 in which said bridging material is removed from the face of said formation at said selected formation by jetting said fracturing liquid against said face.

4. A method according to claim 1 in which said bridging material is removed from the face of said formation by injecting into said temporary sealing agent at said selected elevation a solvent for said bridging material.

5. A method according to claim 1 in which said bridging material is removed from the face of said formation by injecting into said slurry at said selected elevation a solvent for said bridging material, said solvent being injected into said slurry prior to the pumping of said fracturing liquid into said well at said selected elevation.

6. A method according to claim 1 in which said bridging material comprises particles of granular solid and in which at least the smaller of said particles are temporary in said well and are capable of being removed from said well by solution in well fluids produced by said well.

7. A method of producing a fracture at a selected elevation in a permeable formation penetrated by a well including depositing in said well a temporary sealing agent comprising a slurry of bridging maerial in a gel, said bridging material comprising a gradation of particle sizes with at least the smaller particles being temporary in said well and being capable of being removed from said well by solution in well fluids produced by said well, said gel having a viscosity sufficient to prevent settling of said bridging agent therein and said slurry being in sufficient quantity to cover all the permeable formations exposed to said well, pumping a quantity of fracturing liquid into said well at said selected elevation as said temporary sealing agent including said bridging material is displaced from said selected elevation, restricting the movement of said slurry in said well as said fracturing liquid is pumped into said well so that said fracturing liquid is forced into said formation at said selected elevation, said fracturing liquid being pumped into said slurry in said well at said selected elevation at a rate sufficient to increase the pressure exerted on said formation until a formation fracture is indicated by a decrease in the resistance to flow of said fracturing liquid, continuing said pumping after indication of fracture to displace at least a part of said fracturing liquid into the passages formed in said formation, said fracturing liquid being capable of reversion to a liquid which flows freely through said passages after remaining in said formation, and said gel being capable of reversion to a liquid which flows readily from said well, allowing said gel and said fracturing liquid to remain in said well and in said passages respectively for a period of time, to permit said reversion, and then producing said well to remove said granular solid, the dissolved granular solid, and the reverted gel and fracturing liquid from said well.

8. A method of producing fractures at selected elevations in permeable formations penetrated by a well, comprising injecting into said well a slurry of a temporary bridging material in a hydrocarbon gel having a viscosity in the range 1000–5000 centipoises, said slurry being in sufficient quantity to fill and seal said well to a point above said permeable areas, pumping a fracturing liquid into said slurry in said well at a first selected elevation as bridging material is removed from the well wall at said first selected formation and simultaneously restricting said slurry to the area below said point, the filter loss of said slurry to said formation being substantially less than the filter loss of said fracturing liquid to said formation, and said fracturing liquid being pumped into said well at said first selected elevation at a rate sufficient to increase the pressure exerted on said formation until a formation fracture is indicated by a decrease in the resistance to flow of said fracturing liquid, continuing said pumping after indication of fracture to displace at least a part of said fracturing liquid into the passages formed in said formation, pumping said fracturing liquid into said slurry in said well at additional selected elevations in sequence as bridging material is removed from the well wall at said additional selected elevations respectively and while restricting said slurry to the area below said point, said fracturing liquid being pumped into said well at each of said selected elevations at a rate sufficient to increase the pressure exerted on said formation at said elevation until a formation fracture is indicated by a decrease in resistance to flow of said fracturing liquid, continuing said pumping after each indication of fracture to displace a part of said fracturing liquid into the respective passages formed in said formations at said selected elevations, contacting said gel, said fracturing liquid, and a peptizer solution therefor to cause reversion of said gel and said fracturing liquid in said passages to a liquid which flows freely through said passages, and producing said well to withdraw said last-named liquid and said peptizer solution from said well.

9. A method of producing multiple fractures at selected elevations in permeable formations penetrated by a well comprising injecting into said well a temporary sealing agent which includes a gel containing a bridging material to impermeablize all of the permeable areas in said well, pumping a first quantity of fracturing liquid into said temporary sealing agent in said well at a first selected elevation as bridging material is removed from the well wall at said first selected formation while simultaneously restricting said temporary sealing agent to said permeable areas, the filtrate rate of said temporary sealing agent being substantially lower than the filtrate rate of said first quantity of fracturing liquid and said fracturing liquid being pumped into said well at said first selected elevation at a rate sufficient to increase the pressure exerted on said formation until a first formation fracture is indicated by a decrease in the resistance to flow of said fracturing liquid, continuing said pumping after indication of said first fracture to displace at least a part of said first quantity of fracturing liquid into the passages formed in said formation, pumping a second quantity of fracturing liquid into said temporary sealing agent in said well at a second selected elevation as bridging material is removed from the well wall at said second selected elevation and while simultaneously restricting said temporary sealing agent to said permeable areas, the filtrate rate of said temporary sealing agent being also substantially lower than the filtrate rate of said second quantity of fracturing liquid, said second quantity of fracturing liquid being pumped into said well at said second selected elevation at a rate sufficient to increase the presseure exerted on said formation until a second formation fracture is indicated by a decrease in the resistance to flow of said second quantity of fracturing liquid, continuing said pumping of said second quantity of fracturing liquid after indication of said second fracture to displace at least a part of said second quantity of fracturing liquid into other passages formed in said formation, said temporary sealing agent, said first quantity of fracturing liquid and said second quantity of fracturing liquid being capable of reversion in said well after a time interval to a free flowing fluid which flows readily from said passages and said formation, and after allowing sufficient time for said reversion, producing said well to withdraw the reverted liquids from said formation, said passages and said well.

10. A method according to claim 9 in which said bridging material is oil-soluble and granular and has a particle size distribution comprising about one-half in the range of 4–10 mesh U. S. sieve and about one-half in the range −10 mesh U. S. sieve and smaller whereby said first formation fracture is temporarily sealed when said second quantity of fracturing liquid is injected into said well at said second selected elevation and the seal is removed by contact with the oil produced by said formation.

References Cited in the file of this patent
UNITED STATES PATENTS

| | | |
|---|---|---|
| 2,223,397 | White et al. | Dec. 3, 1940 |
| 2,392,352 | Wright | Jan. 8, 1946 |
| 2,547,778 | Reistle | Apr. 3, 1951 |
| 2,596,843 | Farris | May 13, 1952 |
| 2,699,212 | Dismukes | Jan. 11, 1955 |

OTHER REFERENCES

The Oil and Gas Journal, Oct. 14, 1948, pages 76–78. (Copy in Div. 49.)